(12) United States Patent
Laas et al.

(10) Patent No.: US 6,297,343 B1
(45) Date of Patent: Oct. 2, 2001

(54) POWDER COATING CROSSLINKING AGENTS CONTAINING URETDIONE GROUPS AND FREE ISOCYANATE

(75) Inventors: Hans-Josef Laas, Köln; Ulrich Freudenberg, Pulheim; Reinhard Halpaap, Odenthal; Michael Grahl, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/489,984

(22) Filed: Jan. 21, 2000

(30) Foreign Application Priority Data

Jan. 30, 1999 (DE) ................................. 199 03 710

(51) Int. Cl.$^7$ .................................................. C08G 18/80
(52) U.S. Cl. ................................ 528/45; 528/65; 528/66; 528/60; 528/73; 525/440; 252/182.22; 548/951; 548/952
(58) Field of Search ................. 528/60, 45, 65, 528/66, 73; 525/440; 252/182.22; 548/951, 952

(56) References Cited

U.S. PATENT DOCUMENTS

| 4,413,079 | 11/1983 | Disteldorf et al. | 45/169 |
|---|---|---|---|
| 4,463,154 | 7/1984 | Disteldorf et al. | 45/45 |
| 4,483,798 | 11/1984 | Disteldorf et al. | 45/239 A |
| 4,522,975 | 6/1985 | O'Connor et al. | 524/702 |
| 5,596,066 | 1/1997 | Laas et al. | 720/73 |
| 5,621,064 | 4/1997 | Laas et al. | 639/60 |
| 5,773,550 | 6/1998 | Wolf | 790/59 |
| 5,795,950 | 8/1998 | Sugimoto et al. | 760/73 |
| 5,847,044 | 12/1998 | Laas et al. | 803/590 |

FOREIGN PATENT DOCUMENTS

| 2143380 | 8/1995 | (CA) . |
|---|---|---|
| 2186715 | 6/1997 | (CA) . |
| 2213056 | 2/1998 | (CA) . |
| 669354 | 8/1995 | (EP) . |

*Primary Examiner*—Rachel Gorr
(74) *Attorney, Agent, or Firm*—Joseph C. Gil; Thomas W. Roy

(57) ABSTRACT

The present invention relates to polyaddition compounds, which are solid below 40° C. and liquid above 125° C., are prepared by the reaction of an isocyanate component containing uretdione groups with a polyol containing ester and/or carbonate groups, other than hydroxypivalic acid neopentylglycol ester, and have a) an average isocyanate functionality of 2.0 to 8.0 and a content of free isocyanate groups (calculated as NCO; molecular weight=42) of 2.1 to 6.0 wt. %, b) a content of uretdione groups (calculated as $C_2N_2O_2$; molecular weight=84) of 10 to 19 wt. %, c) a content of urethane groups (calculated as —NH—CO—O; molecular weight=59) of 10 to 17 wt. % and d) a content of ester groups —CO—O (calculated as —CO—O; molecular weight=44) and/or carbonate groups —O—CO—O (calculated as —CO—O; molecular weight=44) of 1 to 17 wt. %. The present invention also relates to a process for the preparation of these polyaddition compounds to two-component polyurethane powder coating compositions containing these polyaddition compounds as the crosslinking agent and isocyanate-reactive compounds as the binder.

8 Claims, No Drawings

POWDER COATING CROSSLINKING AGENTS CONTAINING URETDIONE GROUPS AND FREE ISOCYANATE

BACKGROUND OF THE INVENTION

1. Field of the Invention

The present invention relates to new polyaddition compounds containing uretdione groups, to a process for their preparation and to their use as a starting component for the preparation of polyurethane plastics, in particular as a crosslinking agent for powder coatings that can be crosslinked by heat.

2. Description of the Prior Art

Polyaddition compounds containing uretdione groups are increasingly used as crosslinking agents, which are free from blocking groups for polyurethane (PU) powder coatings having high resistance to weathering. Thermal cleavage of the uretdione groups back into free isocyanate groups and subsequent reaction thereof with a hydroxy-functional binder is utilized as the crosslinking principle with these compounds.

Although uretdione powder coating crosslinking agents are known they have not been able to find acceptance in the market. The reason for this is, inter alia, on the one hand a comparatively low isocyanate content of the products currently commercially available, and on the other hand a low average functionality, which is frequently less than 2.0. However, crosslinking agent components having a high NCO content and the highest possible functionality, which is at least 2.0, are desirable to provide an adequate crosslinking density, which in paints and coatings is equivalent to good resistance properties.

EP-A 45 994 describes reaction products of a linear, difunctional IPDI-uretdione and less than stoichiometric amounts of simple diols, which optionally contain ether groups, as powder coating crosslinking agents which are free from blocking agents. These polyaddition products, which may contain up to 8 wt. % of non-blocked free terminal isocyanate groups, are indeed distinguished by high total isocyanate contents (total of isocyanate groups present in free form and in the internally blocked form as uretdione groups) and a functionality of 2.0, but their preparation is difficult, especially on an industrial scale.

Since cleavage of the thermolabile uretdione groups back into the free form noticeably begins at 110° C. in the presence of hydroxy-functional reaction partners, this temperature should not be exceeded in the synthesis of polyaddition compounds containing uretdione groups. Nevertheless, in this temperature range the products described in EP-A 45 994 have such high melt viscosities that their capacity for production in the melt is limited on an industrial scale because of inadequate stirrability. On a large industrial scale, such uretdione crosslinking agents can be prepared only as a solution in solvents which are inert towards isocyanates. The auxiliary solvent must then be separated off in an additional process step. A solvent free preparation process for such polyaddition compounds, which is described in EP-A 669 354 and in which the starting materials can be reacted with one another in special reaction screws or extruders under the action of high shear forces, requires a very high outlay and is very expensive in terms of apparatus.

The main disadvantage of the polyaddition products described in EP-A 45 994, however, is the relatively high content of non-blocked free isocyanate groups which react with the hydroxy-functional binder during the preparation of the powder coating, usually by melt extrusion at approx. 100° C. Powder coatings pre-crosslinked in this way show such unfavorable rheological properties in the stoving process that the resulting coats have only moderate optical properties after curing, in particular a completely inadequate flow.

The problem of undesirable pre-crosslinking exists in principle for all PU powder coating hardeners, which have a high content of free isocyanate groups. For example, in the case of the powder coating crosslinking agents described in EP-A 45 996 and EP-A 45 998, which are free from blocking agents and are obtained from linear IPDI-uretdione and simple diols, the terminally free isocyanate groups are at least partly reacted with monoamines or monoalcohols. The troublesome preliminary reaction in the extruder can indeed be suppressed in this manner, but the chain termination with the monofunctional compound significantly reduces the total isocyanate content, and at the same time the average functionality falls to below 2.0. Also, the products of these two publications have such high melt viscosities at the cleavage temperature of the uretdione groups back into the free form, that they can be prepared reliably and reproducibly only in solution or by the expensive process of EP-A 669 354.

EP-A 639 598 relates to the preparation of uretdione powder coating crosslinking agents using chain lengthening agents containing ester groups or carbonate groups. The products obtained by this process have such low melt viscosities at temperatures only slightly above their melting point that a solvent free production is possible for the first time in a simple stirred apparatus. The uretdione crosslinking agents described in EP-A 720 994, in which dimer diols are employed for chain lengthening, have melt viscosities which are sufficiently low for a solvent free preparation. However, because of the relatively high molecular weight of the chain lengthening agents employed, the products of both publications have reduced total isocyanate contents compared with those of EP-A 45 996.

According to EP-A 669 353, polyurethanes containing uretdione groups, terminal hydroxyl groups, and an average functionality of 2.0 can be prepared in special intensive kneaders by the solvent free reaction of linear IPDI dimers with an excess of diols and/or polyester diols. The use of at least trifunctional polyols and/or branched polyester polyols allows for the preparation of OH-terminal uretdione crosslinking agents having functionalities of between 2 and 3 or ≧3, as shown in EP-A 825 214 and EP-A 780 417. However, the advantage of the high functionality in these polyaddition compounds is counteracted by the disadvantage that the hydroxyl groups present in the crosslinking agent molecule also react under stoving conditions with urethanization, and in this way significantly reduce the internally blocked NCO content available for crosslinking of the binder.

Uretdione powder coating crosslinking agents prepared from HDI dimers optionally containing isocyanurate groups are known from EP-A 760 380. Because of the uretdione groups, these products have very high latent NCO contents, but show such a low tendency towards crystallization, which is usual for HDI-polyisocyanates, that even with intensive cooling they harden completely only after hours or even days. A preparation on an industrial scale is therefore not practical.

EP-A 790 266 relates to polyaddition products which contain uretdione and isocyanurate groups and are obtained from an IPDI dimer prepared by trialkyl-phosphine catalysis, diols and/or di-secondary diamines as chain lengthening agents and optionally monoalcohols or monoamines. These products can also have relatively high contents of free isocyanate groups and, therefore, a high total isocyanate content coupled with a high functionality. Because of the branched starting polyisocyanates, which are obtained with widely varying trimer contents in each case depending on the particular dimerization and working up conditions, the preparation succeeds only after expensive determination of the precise functionality and only in organic solution.

No uretdione powder coating crosslinking agents are known which meet all the requirements in practice and in particular have high total contents of isocyanate groups coupled with the highest possible crosslinking agent functionality and at the same time may be prepared in a simple process without problems.

It is an object of the present invention to provide PU powder coating crosslinking agents, which contain uretdione groups and do not have the disadvantages described above for the prior art.

This object may be achieved with the polyaddition compounds according to the present invention described below and the process for their preparation. The polyaddition compounds according to the invention are based on the surprising observation that by reaction of linear uretdione polyisocyanates with less than stoichiometric amounts of polyols containing ester and/or carbonate groups by a solvent free process in simple apparatus, compounds are prepared that are suitable as powder coating crosslinking agents.

In combination with commercially available powder coating binders, these compounds provide coatings which are distinguished by outstanding flow and very high gloss, in spite of a high content of free isocyanate groups. This was surprising since according to the doctrine of EP-A 639 598 it was to be assumed that such polyaddition compounds containing ester and/or carbonate groups are suitable for use as powder coating crosslinking agents only when the content of free isocyanate groups is less than 2.0 wt. %. Additionally, it is also pointed out in EP-A 760 380 (p. 7, lines 34 to 40) that products having too high a content of non-blocked isocyanate groups lead to coatings with unsatisfactory optical properties because of the unavoidable pre-crosslinking in the extruder.

Although hydroxypivalic acid neopentylglycol ester is mentioned within a long series of simple diols in EP-A 669 354 as a suitable starting compound for the solvent free preparation of polyaddition compounds containing uretdione groups in intensive kneaders, the expert has not been able to obtain any concrete indication at all about the present invention from this publication. Specifically, there is no indication that linear uretdione polyisocyanates can be reacted with polyols containing ester groups and/or carbonate groups in simple stirred apparatus in the melt to give highly functional uretdione powder coating crosslinking agents, which have very high total isocyanate contents and provide paint films of outstanding quality with conventional polyester polyols, in spite of a considerable content of free isocyanate groups. Rather, it can be shown that in contrast to the process products according to the invention, uretdione powder coating crosslinking agents having free isocyanate groups prepared with the exclusive use of hydroxypivalic acid neopentylglycol ester as the chain lengthening agent containing ester groups results in coatings having considerable surface defects, in particular a pronounced orange-peel effect.

SUMMARY OF THE INVENTION

The present invention relates to polyaddition compounds, which are solid below 40° C. and liquid above 125° C., are prepared by the reaction of an isocyanate component containing uretdione groups with a polyol containing ester and/or carbonate groups, other than hydroxypivalic acid neopentylglycol ester, and have a) an average isocyanate functionality of 2.0 to 8.0 and a content of free isocyanate groups (calculated as NCO; molecular weight=42) of 2.1 to 6.0 wt. %, b) a content of uretdione groups (calculated as $C_2N_2O_2$; molecular weight=84) of 10 to 19 wt. %, c) a content of urethane groups (calculated as —NH—CO—O; molecular weight=59) of 10 to 17 wt. % and d) a content of ester groups —CO—O (calculated as —CO—O; molecular weight=44) and/or carbonate groups —O—CO—O (calculated as —CO—O; molecular weight=44) of 1 to 17 wt. %.

The present invention also relates to a process for the preparation of these polyaddition compounds by reacting.

A) uretdione polyisocyanates which are free from isocyanurate groups and optionally B) up to 10 wt. %, based on the total weight of components A) and B), of other diisocyanates with C) polyhydroxy compounds containing ester groups and/or carbonate groups and having an average molecular weight of 134 to 2,000, other than hydroxy-pivalic acid neopentylglycol ester, optionally D) up to 70 wt. %, based on the total weight of components C) and D), of other polyhydroxy compounds which are free from ester groups and carbonate groups and have a molecular weight of 62 to 400, and E) up to 20 wt. %, based on the total weight of compounds C), D) and E), of compounds containing one isocyanate-reactive group, optionally at an equivalent ratio of isocyanate groups to isocyanate-reactive groups of 1.2:1 to 1.8:1.

The invention also relates to two-component polyurethane powder coating compositions containing the polyaddition compound according to the invention as the crosslinking agent and an isocyanate-reactive compound as the binder.

DETAILED DESCRIPTION OF THE INVENTION

Starting compounds A) for the process according to the invention are uretdione polyisocyanates that are free from isocyanurate groups. These can be obtained by catalytically dimerizing a portion of the isocyanate groups of diisocyanates, preferably followed by subsequent removal of the unreacted diisocyanate excess, for example by thin film distillation. Any diisocyanates having aliphatically, cycloaliphatically, araliphatically and/or aromatically bound isocyanate groups are suitable for the preparation of starting compounds A), preferably those having a molecular weight of 140 to 400. Examples include 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanato-decane, 1,3- and 1,4-diisocyanatocyclohexane, 1,3-diisocyanato-2(4)-methylcyclohexane, 1-isocyanato-3,3,5-trimethyl-5-isocyanatomethyl-cyclohexane (isophoronediisocyanate; IPDI), 1-isocyanato-1-methyl-4(3)-isocyanatomethyl-cyclohexane, 4,4'-diisocyanatodicyclohexylmethane, 1,3- and 1,4-phenylene-diisocyanate, 2,4- and 2,6-toluylene-diisocyanate and mixtures of these isomers, diphenylmethane-2,4'- and/or -4,4'-diisocyanate, naphthylene-1,5-diisocyanate and mixtures of such diisocyanates.

Suitable catalysts for the preparation of starting compounds A) are the known compounds which catalyze the dimerization of isocyanate groups, for example the tertiary organic phosphines, described in U.S. Pat. No. 4,614,785, column 4, lines 11 to 47, in DE-A 1,934,763 or DE-A 3,900,053; the tris-(dialkylamino)-phosphines mentioned in EP-A 45,995, DE-A 3,227,779 or DE-A 3,437,635; the substituted pyridines mentioned in DE-A 1,081,895, EP-A 317,744 or EP-A 854,141; the substituted imidazoles or benzimidazoles mentioned in EP-A 417,603; and mixtures of such dimerization catalysts, such as those described in EP-A 780,377.

In the preparation of the polyisocyanates containing uretdione groups by catalytic dimerization of the diisocyanates mentioned above, a trimerization reaction often takes place to a minor extent simultaneously with the dimerization reaction to form polyisocyanates which contain isocyanurate groups and are higher than difunctional. However, suitable starting compounds A) for the process according to the invention are exclusively uretdione polyisocyanates that are free from isocyanurate. The term "free from isocyanurate" in the context of the present invention means that the isocyanurate content is less than 5 mol %, preferably less than 2 mol %, based on the total amount of uretdione and isocyanurate groups. Therefore the average NCO functionality of component A), based on the free NCO groups, is less than 2.1, and is preferably 2.0.

Preferred starting compounds A) for the process according to the invention are uretdione polyisocyanates, which are free from isocyanurate groups and are prepared from diisocyanates having aliphatically and/or cycloaliphatically bound isocyanate groups or mixtures of such polyisocyanates. The use of uretdione polyisocyanates which are free from isocyanurate groups and are prepared from 1,6-diisocyanato-hexane and/or 1-isocyanato-3,3,5-trimethyl-5-isocyanatomethyl-cyclohexane is particularly preferred.

Diisocyanates B) can optionally be used in the process according to the invention. Examples include the diisocyanates described above which are suitable for the preparation of starting compounds A) and have aliphatically, cycloaliphatically, araliphatically and/or aromatically bound isocyanate groups. These diisocyanates B) are used, if at all, in amounts of up to 10 wt. %, preferably up to 5 wt. %, based on the total weight of components A) and B). Preferred diisocyanates B) are diisocyanates having cycloaliphatically bound isocyanate groups. The use of 1-isocyanato-3,3,5-trimethyl-5-isocyanatomethyl-cyclohexane and/or 4,4'-diisocyanatodicyclohexylmethane is particularly preferred.

Polyhydroxy compounds C) which contain ester groups and/or carbonate groups, other than hydroxypivalic acid neopentylglycol ester, and have a number average molecular weight, which can be calculated from the functionality and hydroxyl number, of 134 to 2,000, preferably 176 to 1,200, and an average OH functionality of 2.0 to 4.0, preferably 2.0 to 3.0, are employed in the process according to the invention. Examples include the ester alcohols or ester alcohol mixtures, which can be prepared by reaction of polyhydric alcohols with less than stoichiometric amounts of polybasic carboxylic acids, the corresponding carboxylic acid anhydrides, the corresponding polycarboxylic acid esters of lower alcohols, or lactones.

Polyhydric alcohols which are suitable for the preparation of these ester alcohols include those having a molecular weight of 62 to 400, such as 1,2-ethanediol, 1,2- and 1,3-propanediol, the isomeric butanediols, pentanediols, hexanediols, heptane-diols and octanediols, 1,2- and 1,4-cyclohexanediol, 1,4-cyclohexanedimethanol, 4,4'-(1-methylethylidene)-biscyclohexanol, 1,2,3-propanetriol, 1,1,1-trimethylol-ethane, 1,2,6-hexanetriol, 1,1,1-trimethylolpropane, 2,2-bis(hydroxymethyl)-1,3-propanediol or 1,3,5-tris(2-hydroxyethyl)-isocyanurate.

The acids or acid derivatives used for the preparation of the ester alcohols can be aliphatic, cycloaliphatic, aromatic and/or heteroaromatic and can optionally be unsaturated and/or substituted, e.g. by halogen atoms. Examples of suitable acids include polybasic carboxylic acids having a molecular weight of 118 to 300 or derivatives thereof. Examples include succinic acid, adipic acid, sebacic acid, phthalic acid, isophthalic acid, trimellitic acid, phthalic anhydride, tetrahydrophthalic acid, maleic acid, maleic anhydride, dimeric and trimeric fatty acids, terephthalic acid dimethyl ester and terephthalic acid bis-glycol ester.

Mixtures of the starting compounds previously mentioned can also be employed for the preparation of the ester alcohols. It is also possible to use mixtures of various ester alcohols previously mentioned in the process according to the invention.

Ester polyols, e.g. prepared from lactones and simple polyhydric alcohols as starter molecules via ring-opening-reactions, are preferably employed as starting component C) in the process according to the invention.

Suitable lactones for the preparation of these ester polyols include β-propiolactone, γ-butyrolactone, δ-valerolactone, ε-caprolactone. 3,5,5- and 3,3,5-trimethylcaprolactone or any desired mixtures of such lactones. Starter molecules, which can be used include the polyhydric alcohols having a molecular weight of 62 to 400 previously mentioned or mixtures of these alcohols.

Polyhydroxy compounds C) containing ester groups, which are particularly preferred for the process according to the invention are ester diols, in particular those prepared from ε-caprolactone.

Polyhydroxy compounds containing carbonate groups are also suitable as starting compounds C) for the process according to the invention. Examples include carbonate alcohols, which can be obtained by the reaction of polyhydric alcohols having a molecular weight of 62 to 400 with diaryl carbonates (such as diphenyl carbonate), phosgene or, preferably, cyclic carbonates, such as trimethylene carbonate or 2,2-dimethyl-trimethylene carbonate (neopentylglycol carbonate, NPC). Mixtures of such cyclic carbonates are also suitable. Particularly preferred carbonate alcohols are those which can be prepared from the polyhydric, in particular dihydric alcohols mentioned, as the starter molecule, and NPC via a ring-opening-reaction.

In addition, polyhydroxy compounds containing ester groups and carbonate groups are also suitable as starting compounds C) for the process according to the invention. Examples of these ester carbonate alcohols can be prepared according to DE-A 1,770,245 by reaction of the polyhydric alcohols having a molecular weight of 62 to 400 with lactones, in particular ε-caprolactone, and subsequent reaction of the resulting ester alcohols with diphenyl carbonate. However, ester carbonate alcohols, which can be obtained by reaction of the polyhydric alcohols mentioned with mixtures of lactones and cyclic carbonates with ring-opening reactions are preferably employed.

The preparation of the ester alcohols, carbonate alcohols and ester carbonate alcohols described above, which are preferably employed in the process according to the invention, by ring-opening polymerization is in general carried out in the presence of catalysts. Examples include Lewis or Brönstedt acids or organic tin or titanium compounds, at temperatures of 20 to 200° C., preferably 50 to 160° C.

Mixtures of the ester alcohols, carbonate alcohols, and ester carbonate alcohols mentioned by way of example can optionally be employed as starting component C) in the process according to the invention.

Polyhydroxy compounds D), which have a molecular weight of 62 to 400 and are free from ester groups and carbonate groups can optionally also be used in the process according to the invention. Examples include the simple polyhydric alcohols described above for the preparation of the ester alcohols, or mixtures of these alcohols. Alcohols D) are used, if at all, in amounts of up to 70 wt. %, based on the total amount of starting components C) and D).

Mixtures of starting components C) and D) can also be prepared. Examples include cases where the polyhydric alcohols are only partly converted into polyhydroxy compounds containing ester groups and/or carbonate groups with deficient amounts of acids or acid derivatives, diaryl carbonates or cyclic carbonates, or phosgene.

Monofunctional compounds E), which are reactive towards isocyanate groups, can optionally also be used in the process according to the invention. Examples include simple aliphatic or cycloaliphatic monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols and hydroxymethylcyclohexane; ether alcohols, such as 2-methoxyethanol, 2-ethoxyethanol, 2-propoxyethanol, 2-butoxyethanol, diethylene glycol monomethyl ether, diethyl glycol monoethyl ether, diethylene glycol monobutyl ether, 3-methoxy-1-butanol and glycerol 1,3-diethyl ether; or ester alcohols, such as hydroxyethyl acetate, butyl glycolate, ethyl lactate, glycerol diacetate or those obtained by reaction of the monoalcohols mentioned with lactones.

These monofunctional compounds E) are optionally used in amounts of up to 20 wt. %, preferably up to 15 wt. %, based on the total weight of starting compounds C), D) and E). Preferred starting compounds E) for the process according to the invention are the simple aliphatic or cycloaliphatic monoalcohols.

For carrying out the process according to the invention, the uretdione polyisocyanates A) group and optionally diisocyanates B) are reacted with polyhydroxy compounds C), optionally polyhydroxy compounds D) and optionally monofunctional compounds E) at an equivalent ratio of isocyanate groups to isocyanate-reactive groups of 1.2:1 to 1.8:1, preferably 1.25:1 to 1.6:1. The reaction temperature of 40 to 200° C., preferably 60 to 180° C., is preferably maintained until the theoretically calculated NCO content is obtained.

The nature and amounts of the starting components are otherwise chosen such that the resulting polyaddition compounds comply with the following requirements a) to d):

(a) the polyaddition compounds preferably having an average functionality of 2.0 to 6.0, more preferably 2.0 to 5.0, and a content of free isocyanate groups of preferably 2.2 to 5.0 wt. %, more preferably 2.4 to 4.0 wt. %, (b) the content of uretdione groups is preferably 12 to 18 wt. %, more preferably 14to 17 wt. %, (c) the content of urethane groups is preferably 11 to 17 wt. %, more preferably 12 to 16 wt. %, and (d) the content of carboxylic acid ester groups and/or carbonate groups is preferably 2 to 12 wt. %, more preferably 3 to 10 wt. %.

The polyaddition compounds are solid below 40° C. and liquid above 125° C., and preferably have a melting point or melting range, determined by differential thermoanalysis (DTA), of 40 to 110° C., preferably 50 to 100° C.

The polyaddition products according to the invention containing uretdione groups are distinguished by very low melt viscosities at temperatures only slightly above their melting point or melting range. They can be prepared very easily by the process according to the invention in the melt at temperatures below the temperature of cleavage of uretdione groups. Although the isocyanate components are employed in a molar excess, based on the: polyol components, the products are in general obtained with low contents of monomeric diisocyanates, e.g. less than 1.0 wt. %, preferably less than 0.5 wt. % and more preferably less than 0.3 wt. %.

Nervertheless, the reaction can also be carried out in special apparatus, such as intensive kneaders, at temperatures in the range of the cleavage of uretdiones without an increase in monomeric diisocyanates being observed to a relatively large extent, if sufficiently short reaction times, for example of less than 5 minutes, are adhered to in the reaction.

The reaction can optionally also be carried out in a suitable solvent, which is inert towards isocyanate groups, although this is less preferred. Suitable solvents include the known paint solvents, such as ethyl acetate, butyl acetate, ethylene glycol mono-methyl or -ethyl ether acetate, 1-methoxypropyl-2-acetate, 2-butanone, 4-methyl-2-pentanone, cyclohexanone, toluene and mixtures thereof. Solvents such as propylene glycol diacetate, diethylene glycol dimethyl ether, diethylene glycol ethyl and butyl ether acetate, N-methylpyrrolidone, N-methylcaprolactam and mixtures thereof can also be used.

After the reaction has taken place, these optional solvents are removed from the product by suitable methods. Examples include precipitation and simple filtration with suction, spray drying or melt extrusion in a devolatilization screw.

To accelerate the urethanization reaction, the catalysts known from polyurethane chemistry can be employed in the process according to the invention. Examples include tertiary amines, such as triethylamine, pyridine, methylpyridine, benzyldimethylamine, N,N-endoethylenepiperazine, N-methylpiperidine, pentamethyldiethylene-triamine, N,N-dimethylaminocyclohexane or N,N'-dimethylpiperazine; or metal salts, such as iron(III) chloride, zinc chloride, zinc 2-ethylcaproate, tin(II) octoate, tin(II) ethylcaproate, tin(II) palmitate, dibutyltin(IV) dilaurate and molybdenum glycolate.

The catalysts are optionally employed in amounts of 0.001 to 2.0 wt. %, preferably 0.01 to 0.2 wt. %, based on the total amount of starting compounds.

The polyaddition compounds according to the invention are valuable starting materials for the preparation of polyurethane plastics by the isocyanate polyaddition process. They can be used in particular as a crosslinking agent component in PU powder coatings, which can be cured by means of heat and are free from blocking agents.

Suitable reaction partners for the polyaddition compounds according to the invention include the binders which are known from powder coating technology and have isocyanate-reactive groups, such as hydroxyl, carboxyl, amino, thiol, urethane or urea groups. Hydroxy-functional powder coating binders, which are solid below 40° C. and liquid above 130° C., are preferably employed. The softening temperatures of these hydroxy-functional resins, determined by differential thermoanalysis (DTA), are preferably 30 to 120° C., more preferably 35 to 110° C.

Their hydroxyl numbers are between 20 and 200, preferably between 30 and 130, and their number average molecular weight, calculated from the functionality and the hydroxyl content, is preferably between 400 and 10,000, more preferably between 1,000 and 5,000.

Examples of such powder coating binders include polyesters, polyacrylates or polyurethanes containing hydroxyl groups, such as those described in the above mentioned prior art publications, e.g. EP-A 45,998 (U.S. Pat. No. 4,463,154, herein incorporated by reference) or EP-A 254,152 (U.S. Pat. No. 4,900,800, herein incorporated by reference). Mixtures of such resins are also suitable.

To prepare a ready-to-use powder coating composition, the polyaddition compounds according to the invention are mixed with suitable hydroxy-functional powder coating binders. Additives, such as catalysts, pigments, fillers or flow control agents, may optionally be added. The components are combined to a homogeneous material, for example in extruders or kneaders at temperatures above the melting range of the individual components, for example 70 to 130° C., preferably 70 to 110° C.

The polyaddition compounds according to the invention and the hydroxy-functional binders are employed in such ratios that 0.6 to 2.0, preferably 0.8 to 1.4 isocyanate groups are present for each hydroxyl group. The term "isocyanate groups" in the case of the polyaddition compounds according to the invention is understood to mean the sum of the isocyanate groups present in dimeric form as uretdione groups and free isocyanate groups.

Examples of the optional catalysts used to accelerate the curing include the conventional compounds known from polyurethane chemistry described above and also amidines, such as 1,5-diazabicyclo[4.3.0]non-5-ene (DBN), 1,8-diazabicyclo [5.4.0]-undec-7-ene (DBU) and 1,2-dimethyl-tetrahydropyrimidine, which according to EP-A 803,524, have proven to be particularly suitable catalysts for lowering the stoving temperatures of uretdione powder coating crosslinking agents. These catalysts can optionally be added in amounts of 0.01 to 5.0 wt. %, preferably 0.05 to 2.0 wt. %, based on the total amount of organic binder, i.e. polyaddition compounds according to the invention in combination with the hydroxy-functional powder coating binders, but excluding the additives optionally used.

Under the conditions used to prepare the powder coating compositions, the free isocyanate groups of the polyaddition compounds according to the invention react practically completely, as analyses by IR spectroscopy shows. The isocyanate-free solid, which results after cooling the melt is then ground and sieved to separate particles above the desired particle size, for example, above 0.1 mm.

The powder coating composition prepared in this way is ready for spraying and can be applied by conventional powder application processes, such as electrostatic spraying of the powder or whirl sintering, on to the substrates to be coated. According to the invention, any desired heat-resistant substrates, such as metals, wood or glass can be coated.

The coatings are cured by heating at temperatures of 110 to 220° C., preferably 130 to 200° C., over a period of approx. 10 to 30 minutes. Hard and elastic coatings are obtained, which have a good resistance to solvents and chemicals and are distinguished by outstanding flow and very high gloss.

The invention is further illustrated but is not intended to be limited by the following examples in which all parts and percentages are by weight unless otherwise specified.

EXAMPLES

In the following, all the percentage data relate to the weight, with the exception of the gloss values.

Preparation of Starting Compounds C)

Diol C 1) Containing Ester Groups 901 g of 1,4-butanediol and 1,712 g of ε-caprolactone were mixed at room temperature under dry nitrogen, 0.3 g of tin(II) octoate were added and the mixture 25 was then heated at 160° C. for 5 h. After cooling to room temperature, a colorless liquid product having the following properties was obtained:

$\eta$(23° C.): 180 mPa.s

OH number: 416 mg KOH/g free ε-caprolactone: 0.1% average molecular weight (calc. from the OH number): 269 ester group content (calc.): 25.3%

Diol C 2) Containing Ester Groups 761 g of 1,3-propanediol and 1,712 g of ε-caprolactone were mixed at room temperature under dry nitrogen, 0.3 g of tin(II) octoate were added and the mixture was then heated at 160° C. for 5 h. After cooling to room temperature, a colorless liquid product having the following characteristic data was obtained:

$\eta$(23° C.): 190 mPa.s

OH number: 449 mg KOH/g free ε-caprolactone: 0.3% average molecular weight (calc. from the OH number): 249 ester group content (calc.): 26.7%

Triol C 3) Containing Ester Groups 1,341 g of 1,1,1-trimethylolpropane (TMP) and 1,712 g of ε-caprolactone were mixed at room temperature under dry nitrogen, 0.3 g of tin(II) octoate were added and the mixture was then heated at 160° C. for 5 h. After cooling to room temperature, a colorless liquid product having the following characteristic data was obtained:

$\eta$(23° C.): 2,400 mPa.s

OH number: 546 mg KOH/g free ε-caprolactone: 0.2% average molecular weight (calc. from the OH number): 308 ester group content (calc.): 21.6%

Diol C 4) Containing Carbonate Groups 901 g of 1,4-butanediol and 1,300 g of NPC were mixed at room temperature under dry nitrogen, 0.2 g of ortho-phosphoric acid was added and the mixture was then heated at 160° C. for 8 h. After cooling to room temperature, a practically colorless liquid product having the following properties was obtained:

$\eta$(23° C.): 1,500 mPa.s

OH number: 519 mg KOH/g free NPC: 0.5% average molecular weight (calc. from the OH number): 216 carbonate group content (calc.): 20.0%

Example 1

0.1 g of dibutyltin(IV) dilaurate (DBTL), as a catalyst, was added under dry nitrogen to 1,000 g (4.0 eq) of a polyisocyanate, containing uretdione groups, prepared from 1-isocyanato-3,3,5-trimethyl-5-isocyanatomethyl-cyclohexane (IPDI) and having a content of free isocyanate groups of 16.7%, an average NCO functionality of 2.0 and a content of uretdione groups (determined by hot titration) of 20.9%. The mixture was heated to 80° C. A mixture of 215 g (1.6 eq) of diol C 1) containing ester groups and 72 g (1.6 eq) of 1,4-butanediol was then added over a period of 20 min and the mixture was stirred at a reaction temperature of max. 110° C. until the NCO content of the reaction mixture had fallen to a value of 2.7% after approx. 20 min. For cooling, the melt was poured onto a metal sheet, and a polyaddition compound according to the invention was obtained as a pale yellow solid resin having the following properties:

| NCO content (calc./found): | 2.7/2.6% |
|---|---|
| Uretdione group content (calc.): | 16.2% |
| Total NCO content (calc.): | 18.8% |
| NCO functionality: | 2.0 |
| Monomeric IPDI: | 0.19% |
| Melting range: | 90–98° C. |
| Ester group content (calc.): | 4.2% |
| Urethane group content (calc.): | 14.7% |

Example 2

0.1 g dibutyltin(IV) dilaurate (DBTL), as a catalyst, was added under dry nitrogen to 1,000 g (4.0 eq) of the IPDI-polyisocyanate containing uretdione groups from example 1 and the mixture was heated to 80° C. A mixture of 150 g (1.2 eq) of diol C 2) containing ester groups and 76 g (2.0 eq) of 1,3-propanediol was then added over a period of 20 min and the mixture was stirred at a reaction temperature of max. 110 C until the NCO content of the reaction mixture had fallen to a value of 2.9% after approx. 15 min. For cooling, the melt was poured onto a metal sheet, and a polyaddition compound according to the invention was obtained as a pale yellow solid resin having the following properties:

| NCO content (calc./found): | 2.8/2.7% |
|---|---|
| Uretdione group content (calc.): | 17.0% |
| Total NCO content (calc.): | 19.7% |
| NCO functionality: | 2.0 |
| Monomeric IPDI: | 0.21% |
| Melting range: | 96–105° C. |
| Ester group content (calc.): | 3.3% |
| Urethane group content (calc.): | 15.4% |

Example 3

0.1 g dibutyltin(IV) dilaurate (DBTL), as a catalyst, was added under dry nitrogen to 1.000 g (4.0 eq) of the IPDI-polyisocyanate containing uretdione groups from example 1 and the mixture was heated to 80° C. A mixture of 269 g (2.0 eq) of diol C 1) containing ester groups and 54 g (1.2 eq) of 1,1,1-trimethylolpropane was then added over a period of 20 min and the mixture was stirred at a reaction temperature of max. 110° C. until the NCO content of the reaction mixture had fallen to a value of 2.7% after approx. 20 min. For cooling, the melt was poured onto a metal sheet, and a polyaddition compound according to the invention was obtained as a pale yellow solid resin having the following properties:

| NCO content (calc./found): | 2.7/2.5% |
|---|---|
| Uretdione group content (calc.): | 15.8% |
| Total NCO content (calc.): | 18.5% |
| NCO functionality: | 4.0 |
| Monomeric IPDI: | 0.23% |
| Melting range: | 100–110° C. |
| Ester group content (calc.): | 5.1% |
| Urethane group content (calc.): | 14.3% |

Example 4

0.1 g dibutyltin(IV) dilaurate (DBTL), as a catalyst, was added under dry nitrogen to 1,000 g (4.0 eq) of the IPDI-polyisocyanate containing uretdione groups from example 1 and the mixture was heated to 80° C. A mixture of 215 g (1.6 eq) of diol C 1) containing ester groups and 164 g (1.6 eq) of triol C 3) containing ester groups was then added over a period of 20 min and the mixture was stirred at a reaction temperature of max. 110° C. until the NCO content of the reaction mixture had fallen to a value of 2.6%, after approx. 20 min. For cooling, the melt was poured onto a metal sheet, and a polyaddition compound according to the invention was obtained as a pale yellow solid resin having the following properties:

| NCO content (calc./found): | 2.6/2.4% |
|---|---|
| Uretdione group content (calc.): | 15.2% |
| Total NCO content (calc.): | 17.6% |
| NCO functionality: | 6.0 |
| Monomeric IPDI: | 0.32% |
| Melting range: | 104–113° C. |
| Ester group content (calc.): | 6.5% |
| Urethane group content (calc.): | 13.7% |

Example 5

0.1 g dibutyltin(IV) dilaurate (DBTL), as a catalyst, was added under dry nitrogen to 1,000 g (4.0 eq) of the IPDI-polyisocyanate containing uretdione groups from example 1 and the mixture was heated to 80° C. 324 g (3.0 eq) of diol C 4) containing carbonate groups were then added over a period of 30 min and the mixture was stirred at a reaction temperature of max. 110° C. until the NCO content of the reaction mixture had fallen to a value of 3.2%, after approx. 25 min. For cooling, the melt was poured onto a metal sheet, and a polyaddition compound according to the invention was obtained as a pale yellow solid resin having the following properties:

| NCO content (calc./found): | 3.2/3.2% |
|---|---|
| Uretdione group content (calc.): | 15.8% |
| Total NCO content (calc.): | 19.0% |
| NCO functionality: | 2.0 |
| Monomeric IPDI: | 0.12% |
| Melting range: | 89–97° C. |
| Carbonate group content (calc.): | 4.9% |
| Urethane group content (calc.): | 13.4% |

Example 6 (comparison)

0.1 g dibutyltin(IV) dilaurate (DBTL), as a catalyst, was added under dry nitrogen to 1,000 g (4.0 eq) of the IPDI-polyisocyanate containing uretdione groups from example 1 and the mixture was heated to 80° C. 144 g (3.2 eq) of 1.4-butanediol were then added over a period of 30 min. The heating bath temperature needed to be increased to 130° C. during the diol addition to ensure stirrability, because of the rapidly increasing viscosity of the reaction mixture. After 15 min, the NCO content of the reaction mixture was 3.8%, and remained at this value after 20 min. After 25 min, the temperature of the reaction mixture had risen from 130° C. to above 150° C. under the action of the shear forces, which occurred during stirring, in spite of a constant external temperature, because of the further increased viscosity. The NCO content increased to 4.6% and did not fall again, even during a longer reaction time. The content of monomeric IPDI was 1.4%.

Example 7 (comparison)

0.1 g dibutyltin(IV) dilaurate (DBTL), as a catalyst, was added under dry nitrogen to 1,000 g (4.0 eq) of the IPDI-polyisocyanate containing uretdione groups from example 1 and the mixture was heated to 80° C. 326 g (3.2 eq) of hydroxypivalic acid neopentylglycol ester were then added in portions over a period of 30 min. The heating bath temperature needed to be increased to 120° C. towards the end of the diol addition to ensure stirrability, because of the rapidly increasing viscosity of the reaction mixture. After 15 min, the NCO content of the reaction mixture was 3.2%. After 20 min, the temperature of the reaction mixture had risen from 120° C. to 147° C. under the action of the shear forces which occur during stirring, in spite of a constant external temperature, because of the further increased viscosity. The NCO content increased to 4.1% and did not fall again, even during a longer reaction time. The content of monomeric IPDI was 1.1%.

Comparison examples 6 and 7 demonstrate that during the reaction of the polyisocyanate containing uretdione groups with simple diols or hydroxypivalic acid neopentylglycol ester in the melt in accordance with the process described in example 1, uretdione cleavage occurred to a considerable extent. The required NCO contents of 2.9% (example 6) or 2.5% (example 7) were not reached, and the contents of monomeric diisocyanate significantly exceeded the limit of 1%.

Example 8 (comparison, analogous to EP-A 45 994)

1,000 g (4.0 eq) of the polyisocyanate containing uretdione groups from example 1 were initially introduced into 1,144 g of anhydrous toluene and 0.1 g of dibutyltin(IV) dilaurate (DBTL), as a catalyst, under dry nitrogen at 80° C. 144 g (3.2 eq) of 1,4-butanediol were added over a period of 30 min and the mixture was stirred at a reaction temperature of 100° C. until the NCO content had fallen to a value of 1.5%. The pale yellow solution obtained was then freed completely from the solvent by spray drying in a commercially available laboratory spray dryer, Minispray Dryer 190 (Büchi): A pale yellow product having the following properties was obtained:

| | |
|---|---|
| NCO content (calc./found): | 2.9/2.9% |
| Uretdione group content (calc.): | 18.3% |
| Total NCO content: | 21.2% |
| NCO functionality: | 2.0 |

-continued

| | |
|---|---|
| Monomeric IPDI: | 0.12% |
| Melting point: | 111–120° C. |
| Ester group content (calc.): | — |
| Urethane group content (calc.): | 16.5% |

Example 9 (use)

55.4 parts by wt. of a commercially available polyester containing hydroxyl groups (Crylcoat 240, UCB Chemicals) and having an OH number of 30 were mixed thoroughly with 6.6 parts by wt. of the polyaddition compound according to the invention from example 1 (which corresponded to an equivalent ratio of total NCO to OH of 1:1), 1.5 parts by wt. of a commercially available flow control agent (Modaflow Powder III, Solutia), 1.0 parts by wt. tin(II) palmitate, as a catalyst, 0.5 part by wt. benzoin and 35.0 parts by wt. of a white pigment (Kronos 2160, Kronos Titan). The mixture was then homogenized with the aid of a Buss cokneader of the type PLK 46 at 100 rpm and a housing temperature of 100 to 120° C. in the process part. After cooling, the solidified melt was ground and sieved with the aid of a sifter mill, (ACM 2, Hosokawa Mikropul), with a 90 μm sieve. The resulting powder, which no longer contained free isocyanate groups according to analyses by IR spectroscopy, was sprayed with an ESB cup gun at a high voltage of 70 kV on to a degreased steel sheet and cured at 180° C. for 15 min.

For comparison, a powder coating was prepared analogously from 56.1 parts by wt. of the same polyester containing hydroxyl groups, 5.9 parts by wt. of the polyaddition compound obtained according to comparison example 8, 1.5 parts by wt. of a commercially available flow control agent (Modaflow Powder III, Solutia), 1.0 part by wt. tin(II) palmitate, as a catalyst, 0.5 part by wt. benzoin and 35.0 parts by wt. of a white pigment (Kronos 2160, Kronos Titan). The mixture was sprayed on to a degreased steel sheet and also cured at 180° C. for 15 min. The equivalent ratio of total NCO to OH was also 1:1.

The two coatings were then tested to determine their properties. In addition to the gloss and clouding values, the orange-peel effect was measured with the aid of a "wave-scan plus" apparatus from Byk-Gardner and used to characterize the surface structure. At coating thicknesses of approx. 60 μm, the following properties were found:

| Powder coating with polyaddition compound from | Example 1 | Example 8 (comparison) |
|---|---|---|
| Impact (ASTM-D-2794-69) | >80 ip | <5 ip |
| Gloss 60°/20° (DIN 67530) | 106/89 | 96/64 |
| Haze (DIN 67530; ISO 2813) | 55 | 90 |
| Wave scan: long wave (nc/c)[1] | 35.4/33.1 | 57.3/55.9 |
| short wave (nc/c)[1] | 31.3/28.5 | 55.8/55.8 |
| tension (nc/c)[1] | 10.3/10.7 | 6.7/7.0 |

[1]nc/c: non-corrected and corrected values

The comparison showed that a completely crosslinked coating was obtained using the polyaddition compound according to the invention as compared to the coating produced using the known polyaddition compound of the prior art. It was distinguished by a considerably higher elasticity, a higher gloss, less clouding and a significantly better flow. While the coating obtained according to the invention flowed smoothly, the comparison coating showed a severe orange-peel structure and also had a large number of pinholes and bubbles.

Example 10 to 13 (use)

Powder coating compositions pigmented white were prepared by the process described in Example 9 starting from the polyester containing hydroxyl groups described in Example 9 and polyaddition compounds 2, 3, 4 and 5 according to the invention. The ready-formulated powder coating compositions, which were free from non-blocked isocyanate groups in all cases according to analyses by IR spectroscopy, were each sprayed with an ESB cup gun at a high voltage of 70 kV onto a degreased steel sheet and cured at 180° C. for 15 min. The following table sets forth the compositions (parts by wt.) of the powder coating compositions and the properties of the resulting coatings (coating thickness in each case about 70 μm).

|  | Example 10 | Example 11 | Example 12 | Example 13 |
| --- | --- | --- | --- | --- |
| Polyester polyol from Ex. 9 | 55.7 | 55.4 | 55.0 | 55.4 |
| Polyaddition compound from |  |  |  |  |
| Example 2 | 6.3 | — | — | — |
| Example 3 | — | 6.6 | — | — |
| Example 4 | — | — | 7.0 | — |
| Example 5 | — | — | — | 6.6 |
| Flow control agent from Ex. 9 | 1.5 | 1.5 | 1.5 | 1.5 |
| Tin(II) palmitate | 1.0 | 1.0 | 1.0 | 1.0 |
| Benzoin | 0.5 | 0.5 | 0.5 | 0.5 |
| Kronos 2160 | 35.0 | 35.0 | 35.0 | 35.0 |
| Impact (ASTM-D-2794-69) | >80 ip | >80 ip | >80 ip | >80 ip |
| Gloss 60°/20° (DIN 67530) | 104/88 | 102/85 | 98/84 | 106/89 |
| Haze (DIN 67530; ISO 2813) | 49 | 60 | 58 | 52 |
| Wave scan: long wave (nc/c)[1] | 40.3/39.2 | 41.5/39.6 | 42.1/41.0 | 35.3/34.0 |
|  | 35.6/35.8 | 43.3/41.7 | 42.9/42.2 | 36.3/35.0 |
| short wave (nc/c)[1] | 9.4/9.6 | 9.2/9.5 | 9.1/9.3 | 10.3/10.5 |
| tension (nc/c)[1] |  |  |  |  |

[1]nc/c: non-corrected and corrected values

Although the invention had been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyaddition compound which is solid below 40° C. and liquid above 125° C., is prepared by the reaction of an isocyanate component containing uretdione groups with a polyol containing ester and/or carbonate groups, other than hydroxypivalic acid neopentylglycol ester, and has
    a) an average isocyanate functionality of 2.0 to 8.0, and a content of free isocyanate groups (calculated as NCO; molecular weight=42) of 2.1 to 6.0 wt. %,
    b) a content of uretdione groups (calculated as $C_2N_2O_2$; molecular weight=84) of 10 to 19 wt. %,
    c) a content of urethane groups (calculated as —NH—CO—O; molecular weight=59) of 10 to 17 wt. % and
    d) a content of ester groups —CO—O (calculated as —CO—O; molecular weight=44) and/or carbonate groups —O—CO—O (calculated as —CO—O; molecular weight=44) of 1 to 17 wt. %.

2. A process for the preparation of a polyaddition compound which is solid below 40° C. and liquid above 125° C. and has
    a) an average isocyanate functionality of 2.0 to 8.0, and a content of free isocyanate groups (calculated as NCO; molecular weight=42) of 2.1 to 6.0 wt. %,
    b) a content of uretdione groups (calculated as $C_2N_2O_2$; molecular weight=84) of 10 to 19 wt. %,
    c) a content of urethane groups (calculated as —NH—CO—O; molecular weight=59) of 10 to 17 wt. % and
    d) a content of ester groups —CO—O (calculated as —CO—O; molecular weight=44) and/or carbonate groups —O—CO—O (calculated as —CO—O; molecular weight=44) of 1 to 17 wt. %, which comprises reacting A) a uretdione polyisocyanate which is free from isocyanurate groups and optionally B) up to 10 wt. %, based on the total weight of components A) and B), of another diisocyanates with C) a polyhydroxy compound having an average molecular weight of 134 to 1200 and containing ester groups and/or carbonate groups, other than hydroxypivalic acid neopentylglycol ester, optionally D) up to 70 wt. %, based on the total weight of components C) and D), of another polyhydroxy compound which is free from ester groups and carbonate groups and has a molecular weight of 62 to 400, and optionally E) up to 20 wt. %, based on the total weight of compounds C), D) and E), of a compound containing one isocyanate-reactive group, at an equivalent ratio of isocyanate groups to groups which are reactive towards isocyanates of 1.2:1 to 1.8:1.

3. The process of claim 2 wherein uretdione polyisocyanate A) is prepared from a diisocyanate having aliphatically and/or cycloaliphatically bound isocyanate groups.

4. The process of claim 2 wherein uretdione polyisocyanate A) is prepared from 1,6-diisocyanatohexane and/or 1-isocyanato-3,3,5-trimethyl-5-isocyanato-methylcyclohexane.

5. The process of claim 2 wherein polyhydroxy compound C) is a polyester polyol prepared by ring-opening polymerization of ε-caprolactone.

6. The process of claim 3 wherein polyhydroxy compound C) is a polyester polyol prepared by ring-opening polymerization of ε-caprolactone.

7. The process of claim 4 wherein polyhydroxy compound C) is a polyester polyol prepared by ring-opening polymerization of ε-caprolactone.

8. A two-component polyurethane powder coating composition containing the polyaddition compound of claim 1 as the crosslinking agent and an isocyanate-reactive compound as the binder.

* * * * *